US006789958B2

(12) United States Patent
Ahrens et al.

(10) Patent No.: US 6,789,958 B2
(45) Date of Patent: Sep. 14, 2004

(54) RELEASE MECHANISM FOR PLUGGABLE FIBER OPTIC TRANSCEIVER

(75) Inventors: Michael E. Ahrens, Campbell, CA (US); Neil P. Cannon, Boulder, CO (US)

(73) Assignee: Infineon Technologies AG, Munich (DE)

(*) Notice: Subject to any disclaimer, the term of this patent is extended or adjusted under 35 U.S.C. 154(b) by 147 days.

(21) Appl. No.: 09/945,119

(22) Filed: Aug. 31, 2001

(65) Prior Publication Data

US 2003/0044129 A1 Mar. 6, 2003

(51) Int. Cl.[7] .................................................. C02S 6/36
(52) U.S. Cl. ......................................... 385/92; 439/483
(58) Field of Search ................................ 361/728, 747, 361/754; 385/88, 89, 90, 91–94, 134, 135; 439/142, 144, 476.1, 483, 484

(56) References Cited

U.S. PATENT DOCUMENTS 4,995,821 A 2/1991 Casey
5,021,003 A 6/1991 Ohtaka et al.
5,546,281 A 8/1996 Poplawski et al.
5,717,533 A 2/1998 Poplawski et al.
5,734,558 A 3/1998 Poplawski et al.
5,864,468 A 1/1999 Poplawski et al.
5,879,173 A 3/1999 Poplawski et al.
5,901,263 A 5/1999 Gaio et al.
5,980,324 A 11/1999 Berg et al.
6,074,228 A 6/2000 Berg et al.
RE36,820 E 8/2000 McGinley et al.
6,101,087 A 8/2000 Sutton et al.
6,142,802 A 11/2000 Berg et al.
6,149,465 A 11/2000 Berg et al.
6,179,627 B1 1/2001 Daly et al.
6,186,670 B1 * 2/2001 Austin et al. ................. 385/55
6,201,704 B1 3/2001 Poplawski et al.
6,220,878 B1 4/2001 Poplawski et al.
6,267,606 B1 7/2001 Poplawski et al.
6,371,787 B1 * 4/2002 Branch et al. .............. 439/352
6,494,623 B1 * 12/2002 Ahrens et al. ................ 385/76
6,508,593 B1 * 1/2003 Farnsworth et al. .......... 385/55
6,570,768 B2 * 5/2003 Medina ...................... 361/747

* cited by examiner

*Primary Examiner*—Thanh-Tam Le
(74) *Attorney, Agent, or Firm*—Bever, Hoffman & Earms, LLP; Patrick T. Bever

(57) ABSTRACT

A release mechanism for manually securing a pluggable fiber optic transceiver to a cage mounted on a host circuit board. The release mechanism includes a pivoting faceplate connected to a transceiver housing such that the faceplate is rotatable from a first position in which the faceplate is positioned over a front surface of the housing to a second position in which the faceplate is pivoted away from the front surface of the housing. The release mechanism also includes a lever that disengages a boss from an opening formed in a resilient transceiver latch of the cage when the faceplate is in the second position. In one embodiment the boss is mounted on the housing, and the lever pushes the transceiver latch away from the boss. In another embodiment, the boss is mounted on the lever.

26 Claims, 6 Drawing Sheets

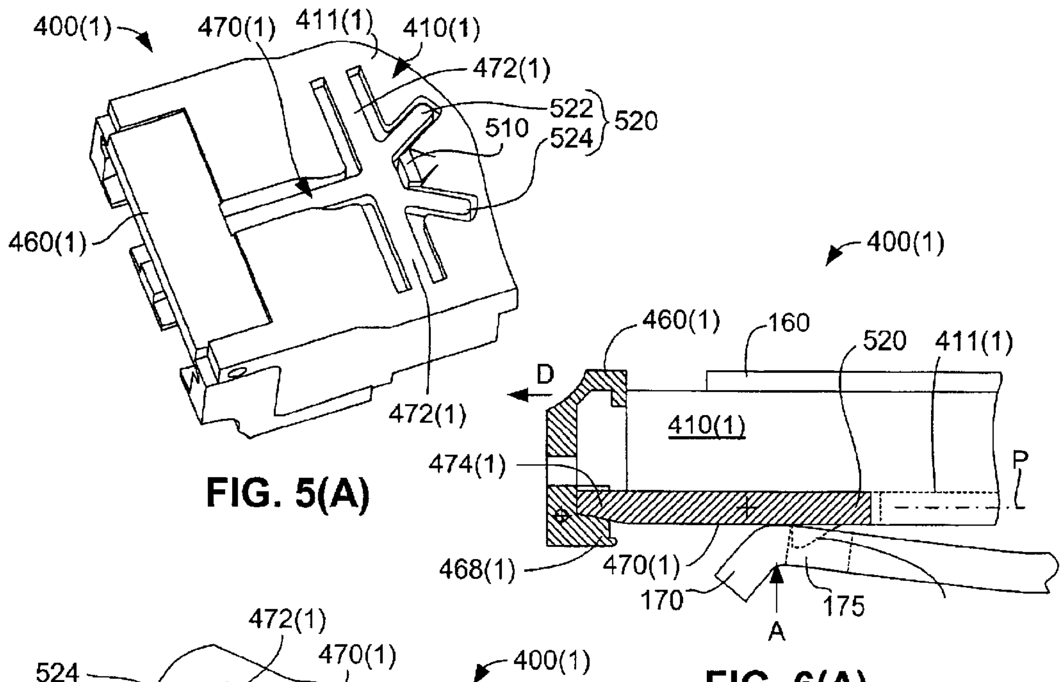
FIG. 5(A)
FIG. 6(A)
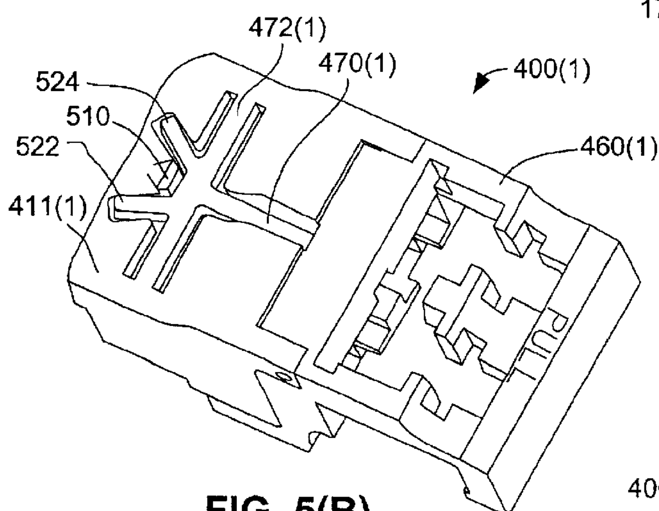
FIG. 5(B)
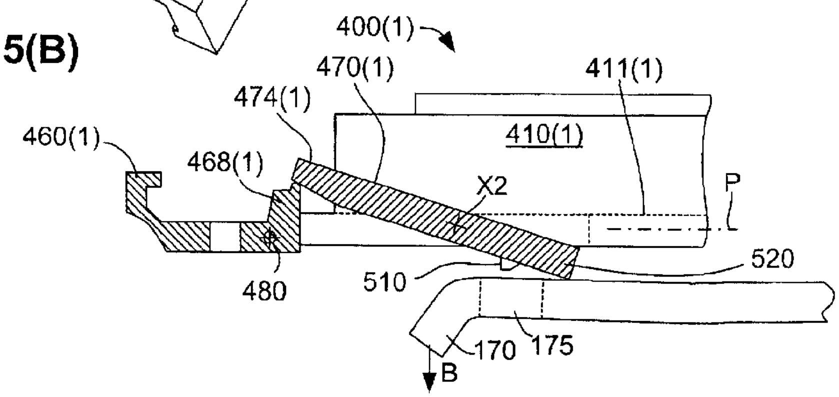
FIG. 6(B)

RELEASE MECHANISM FOR PLUGGABLE FIBER OPTIC TRANSCEIVER

FIELD OF THE INVENTION

This invention relates to fiber optic (optoelectronic) communications, and more particularly to pluggable fiber optic transceivers utilized in fiber optic systems.

BACKGROUND OF THE INVENTION

Fiber optic transceivers facilitate bi-directional data transmissions between electronic devices (e.g., computer, input/output system, peripheral device, or switch) and optical data links in fiber optic (optoelectronic) systems. Each transceiver includes a photodetector for converting optically encoded data received from an optical data link to electrically encoded data readable by a host electronic device, and a laser diode for converting electrically encoded data signals from the host electronic device that are converted into optical signals and transmitted to the optical data link. Each transceiver is mounted onto a circuit card assembly of the host electronic device, and is therefore typically packaged such that it occupies as little circuit card surface area as possible.

Small Form-factor Pluggable (SFP) transceivers are one type of transceiver having standardized physical dimensions and performance characteristics that are defined in the "Cooperation Agreement for Small Form-Factor Pluggable Transceivers", as executed on Sep. 14, 2000 (herein "the Cooperation Agreement"), which is incorporated herein in its entirety. The Cooperation Agreement is part of an SFP Transceiver multi-source agreement whose purpose is to establish internationally compatible sources of pluggable fiber optic transceivers in support of established standards for fiber optic systems. Specifically, the Cooperation Agreement sets forth transceiver package dimensions, cage and electrical connector specifications, host circuit board layouts, electrical interface specifications, and front panel bezel requirements that are followed by each party.

FIG. 1 is a simplified exploded perspective view depicting a transceiver assembly 100 that complies with the Cooperation Agreement. Transceiver assembly 100 includes a host circuit board 130 upon which is mounted a standard female electrical connector 140, a pluggable transceiver 150, a cage 160, and an optional bezel 180 (shown in dashed lines) that is mounted over the front end of transceiver assembly 100.

Pluggable transceiver 150 includes transceiver electronics that are mounted in an elongated transceiver housing 151 that is designed for "pluggable" insertion into cage 160. Transceiver housing 151 includes an upper surface defining several vent holes, a lower surface including a boss 152 (shown in dashed lines), and a front surface defining pair of receptacles 153 for receiving standard optical connectors 190 (e.g., duplex LC, MT-RJ, or SC connectors). Mounted within housing 151 is a circuit board 154 for supporting the transceiver electronics, which process data signals from and supply data signals to a photodetector 155 and a laser diode 156, respectively. A pair of ferrules 157 is mounted in receptacles for aligning standard optical connectors (not shown) with photodetector 155 and laser diode 156. Extending from the back end of circuit board 154 is a male connector card 158 including contacts 159 that mate with corresponding contacts 144 of female connector 140 when cage 160 is mounted on host circuit board 130 and pluggable transceiver 150 is fully inserted into cage 160.

Referring to the center of FIG. 1, cage 160 includes a first side wall 161, a second side wall 162, a top wall 163, and a bottom wall 164 that collectively define a front opening 165 for receiving pluggable transceiver 150. Cage 160 also includes a back wall 166, which includes a leaf spring for biasing transceiver 150 toward opening 165. Extending downward from side walls 161 and 162 and back wall 166 are feet 167 that are press fitted into holes 135 formed in host circuit board 130. Note that holes 135 are plated with a conductive material 136 to provide a ground connection between cage 160 and host circuit board 130. Bottom wall 164 and back wall 166 define an opening for receiving female connector 140 when cage 160 is press fitted onto host circuit board 130. A series of resilient clips 168 are formed by folding elongated tabs extending from walls 161, 162, 163, and 164, and are utilized to provide electrical connection between cage 160 and optional bezel 180. Formed on bottom wall 164 of cage 160 is a transceiver latch 170 that defines a latch opening 175 for receiving boss 152 provided on the lower surface of transceiver housing 151 to secure transceiver 150 inside cage 100. A series of vent holes are formed on top wall 163 that align with vent holes formed in transceiver housing 151 (discussed above), and cooperate with an optional system ventilation (cooling) system to maintain transceiver 150 at a desired operating temperature. Cage 160 includes dimensions that are consistent with the standards set forth in the Cooperation Agreement, and is discussed in further detail in co-pending U.S. patent application Ser. No. 09/810,820-6776, entitled "SINGLE-PIECE CAGE FOR PLUGGABLE FIBER OPTIC TRANSCEIVER", which is incorporated herein by reference.

FIGS. 2(A) through 2(D) are simplified partial side views depicting the attachment and subsequent removal of transceiver 150 to/from cage 160. As indicated in FIGS. 2(A), 2(B) and 2(C), as transceiver 150 is pushed into cage 160 (i.e., between upper wall 163 and lower wall 164 in the direction indicated by arrow A), transceiver latch 170 is pushed downward (i.e., bent away from transceiver housing 151 in the direction indicated by arrow B) by boss 152 until boss 152 enters latch opening 175, at which point transceiver latch 170 is resiliently biased upward (i.e., in the direction indicated by arrow C; see FIG. 2(C)). In this latched state, movement of transceiver 150 out of cage 100 (i.e., in the direction of arrow D in FIG. 2(C)) is prevented by the contact between boss 152 and the inner edge of latch opening 175. As shown in FIG. 2(D), subsequent manipulation of latch 170 (e.g., by a manual force F) releases boss 152 from latch opening 175, thereby allowing removal of transceiver 150. Ideally, the spring provided on back wall 166 of cage 160 pushes transceiver 150 forward (i.e., in the direction of arrow D) when latch 170 is manipulated as shown in FIG. 2(D).

A problem associated with the conventional transceiver latching mechanism depicted in FIGS. 2(A) through 2(D) is that in highly populated arrangements (i.e., in which many transceiver assemblies are mounted in close proximity), it is often very difficult to manipulate transceiver latch 170, thereby making it difficult to remove transceiver 150 from cage 160.

FIG. 3 is a simplified side view showing a "belly-to-belly" configuration in which two transceiver assemblies 100-1 and 100-2 are mounted on opposite sides of host circuit board 130. Specifically, a first cage 160-1 is mounted on an upper side of host circuit board 130 into which a first transceiver 150-1 is inserted, and a second cage 160-2 is mounted on a lower side of host circuit board 130 into which a second transceiver 150-2 is inserted. Such a "belly-to-belly" arrangement is utilized to facilitate highly populated circuit boards that minimize space requirements. A problem with this and other highly populated transceiver arrangements is that they make accessing and manipulating transceiver latches (e.g., transceiver latches 170-1 and 170-2; see FIG. 3) very difficult, thereby increasing maintenance costs. Further, manipulation of conventional transceiver latches is not reliable and confusing.

What is needed is a release mechanism for pluggable fiber optic transceivers that is easy to access in highly populated transceiver arrangements, and is both reliable and intuitive.

SUMMARY OF THE INVENTION

The present invention is directed to a release mechanism for pluggable fiber optic transceivers including an intuitive, reliable, and easily manipulated release mechanism that is easily accessed for locking, unlocking, and removing a pluggable fiber optic transceiver from an associated transceiver cage.

In accordance with a first aspect of the present invention, the release mechanism includes a pivoting faceplate connected to the front end of a transceiver housing using a shaft or other coupling mechanism that allows the faceplate to rotate relative to the housing. In a first (locked) position, the faceplate covers the front end of the transceiver housing, and openings defined in the faceplate are aligned with receptacles mounted in the transceiver housing to allow normal insertion and removal of fiber optic connectors. To remove the transceiver housing from a host cage, the faceplate is rotated 90° relative to the housing into a second (unlocked) position in which a top wall of the faceplate is positioned to prevent insertion of fiber optic connectors into the receptacles of the transceiver housing. The top wall includes an optional curved surface to facilitate manual removal of the pluggable transceiver from a host cage.

In accordance with a second aspect of the present invention the release mechanism includes a lever pivotably mounted on the transceiver housing. The lever has a first (front) end located adjacent to the faceplate, and a second end located adjacent to the transceiver latch of a host cage. In one embodiment, the lever includes a pair of torsion members integrally molded to a lower wall of the transceiver housing. When the faceplate is in the first (locked) position, the lever remains in an unbiased state in which a boss is inserted into the transceiver latch to prevent removal of the transceiver housing from the host cage. When the faceplate is rotated into the second (unlocked) position, a portion of the faceplate presses against the first end of the lever, which causes the lever to pivot around an axis defined by the torsion members such that the second end of the lever disengages the boss from the transceiver latch, thereby facilitating removal of the pluggable transceiver from the host cage.

In accordance with a first disclosed embodiment, the boss is formed on the lower wall of the transceiver housing, and the second end of the lever includes a forked member that partially surrounds the boss. When the faceplate is in the first (locked) position, the forked member remains in the plane defined by the lower wall such that the boss is engaged with the transceiver latch to prevent removal of the pluggable transceiver from the host cage. When the faceplate is rotated into the second (unlocked) position, a cam portion of the faceplate presses against the first end of the lever, which causes the lever to pivot around an axis defined by the torsion members such that the forked member pushes the transceiver latch away from the boss, thereby facilitating removal of the pluggable transceiver from the host cage.

In accordance with a second disclosed embodiment, the boss is mounted on the second end of the lever. When the faceplate is in the first (locked) position, the lever remains in the plane defined by the lower wall such that the boss is engaged with the transceiver latch to prevent removal of the pluggable transceiver from the host cage. When the faceplate is rotated into the second (unlocked) position, a cam portion of the faceplate pulls the first end of the lever downward, which causes the lever to pivot around an axis defined by the torsion members such that the second end is lifted away from the transceiver latch, thereby disengaging the boss and facilitating removal of the pluggable transceiver from the host cage.

BRIEF DESCRIPTION OF THE DRAWINGS

These and other features, aspects and advantages of the present invention will become better understood with regard to the following description, appended claims, and accompanying drawings, where:

FIGS. 5(A) and 5(B) are alternative perspective views showing a lever of the release mechanism according to a first embodiment;

FIGS. 6(A) and 6(B) are simplified cross-sectional side views showing the lever of FIGS. 5(A) and 5(B) in a locked (first) position and an unlocked (second) position, respectively;

DETAILED DESCRIPTION OF THE DRAWINGS

Figure 1:
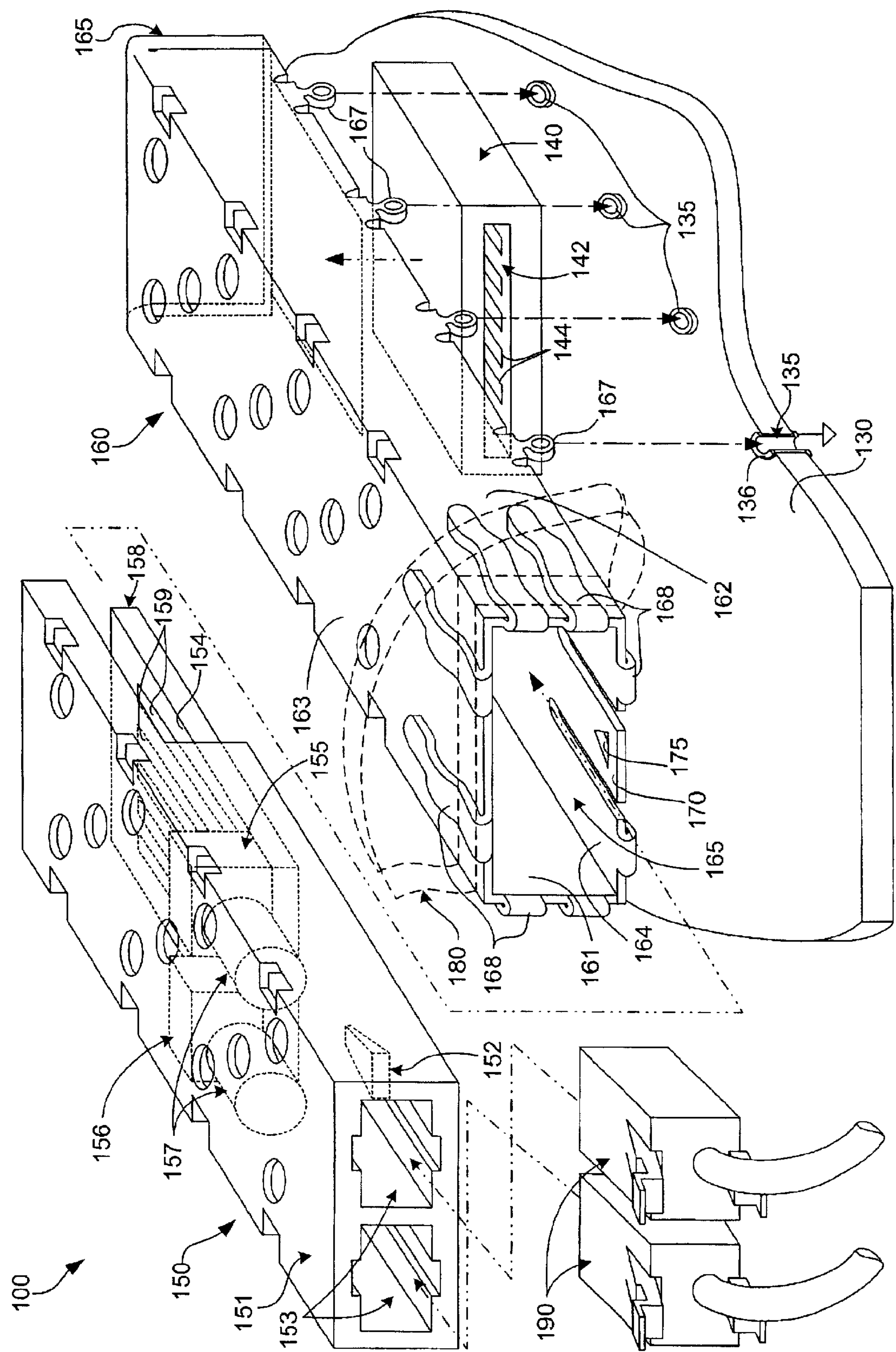
FIG. 1 is an exploded perspective view showing a conventional transceiver assembly.
Figure 2A:
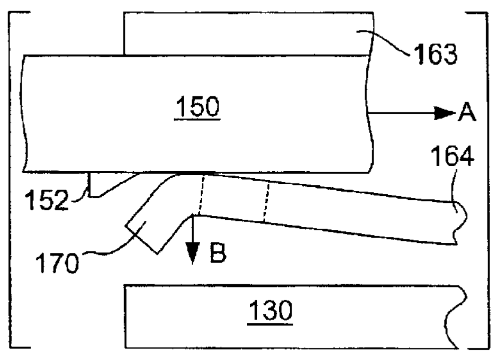
FIGS. 2(A), 2(B), 2(C), and 2(D) are simplified partial side views showing a latching mechanism of a conventional transceiver.
Figure 2B:
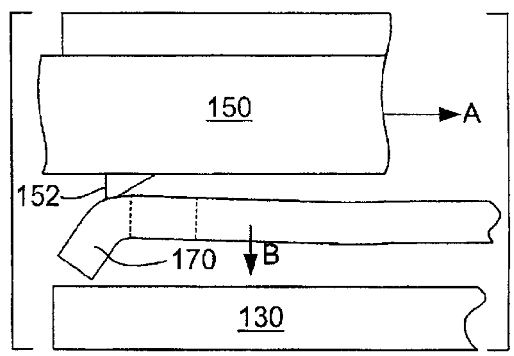
Figure 2C:
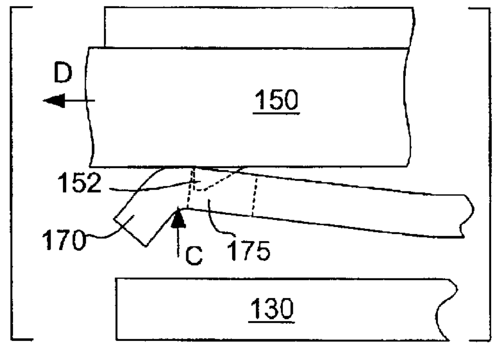
Figure 2D:
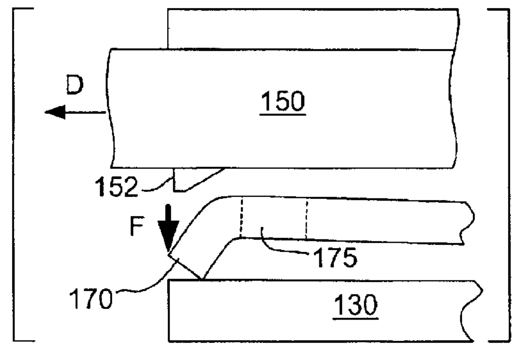
Figure 3:
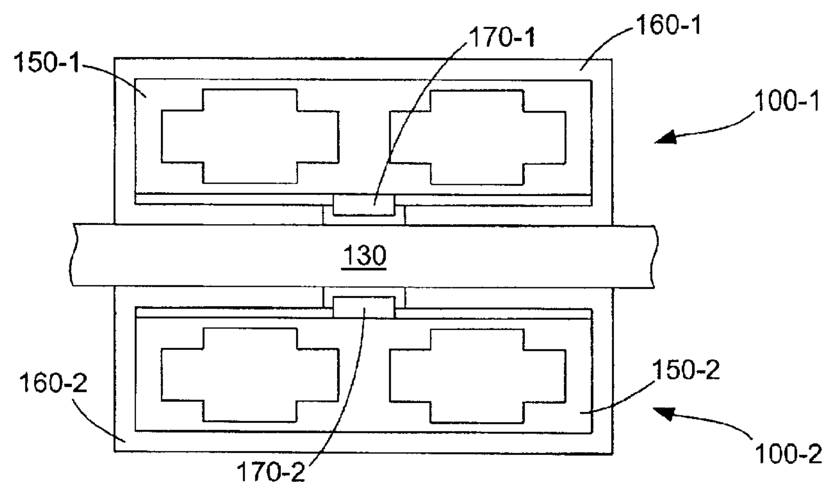
FIG. 3 is a front view showing two conventional transceivers in a belly-to-belly arrangement.
Figure 4A:
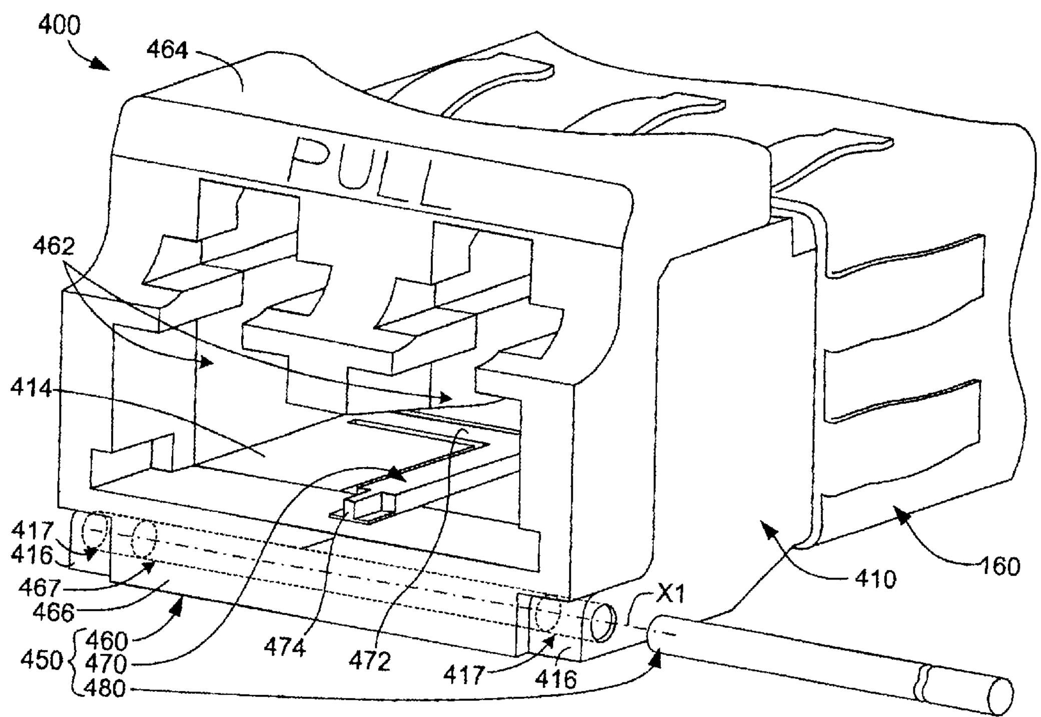
FIGS. 4(A) and 4(B) are partial perspective views showing a transceiver including a release mechanism according to the present invention.
Figure 4B:
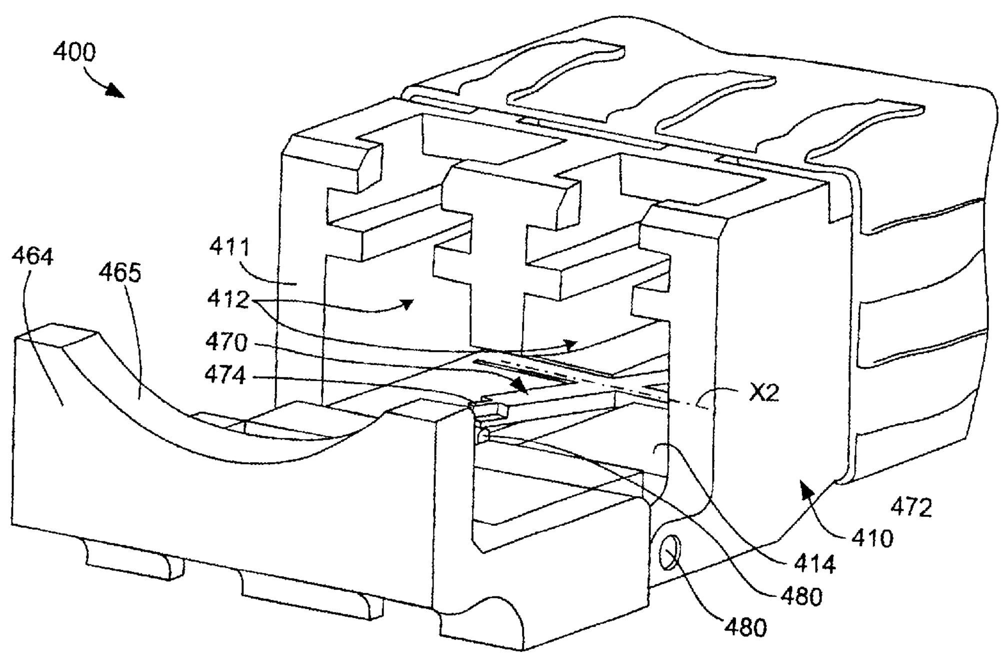

FIGS. 4(A) and 4(B) are partial top/front perspective views showing a pluggable transceiver 400 according to an embodiment of the present invention. Pluggable transceiver 400 generally includes a housing 410 and a release mechanism 450 for manually securing housing 410 to and removing housing 410 from a host cage 160. As indicated in FIG. 4(B), housing 410 includes a front surface 411 defining a pair of receptacles 412 that are provided for receiving standard fiber optic connectors (not shown). Housing 410 also includes a lower wall 414, and a pair of flanges 416 extending from a lower portion of front surface 411, each flange 416 defining a through hole 417. As indicated in FIG. 4(A), release mechanism 450 generally includes a faceplate 460, a lever 470, and a pin (shaft) 480. Omitted for brevity from FIGS. 4(A) and 4(B) are rear sections of housing 410 and cage 160 that include transceiver electronics and structural features similar to those described above with reference to conventional pluggable transceiver 100 (see FIG. 1).

In accordance with a first aspect of the present invention, faceplate 460 is pivotably connected to housing 410 such that faceplate 460 is rotatable from a first position (shown in FIG. 4(A)) in which faceplate 460 is positioned over (i.e., adjacent to) front surface 411 of housing 410, to a second position (shown in FIG. 4(B)) in which faceplate 460 is pivoted away from front surface 411 of housing 410. Faceplate 460 defines front openings 462 that are aligned with receptacle 412 of housing 410 when faceplate 460 is in the first position (shown in FIG. 4(A)), thereby facilitating manual insertion of fiber optic connectors (e.g., connectors 190, shown in FIG. 1). As shown in FIG. 4(B), faceplate 460 further includes a top wall 464 that is positioned to block insertion of the fiber optic connectors into the receptacle when faceplate 460 is rotated into the second position. As also shown in FIG. 4(B), top wall 464 includes a curved surface 465 that is shaped to receive a user's fingertip, thereby facilitating manual removal of housing 410 from host cage 160. Referring to FIG. 4(A), pin 480 inserted into through holes 417 formed in housing 410, and is also inserted into a through hole 467 formed in a flange 466 located at the lower portion of faceplate 460. When inserted, pin 480 couples faceplate 460 to housing 410 and establishes an axis of rotation X1 around which faceplate 460 pivots relative to housing 410.

Faceplate 460 facilitates convenient and intuitive insertion of housing 410 into and removal of housing 410 from host cage 160 by providing a suitable handle when rotated into the second position (shown in FIG. 4(B)). Referring to FIG. 4(A), when housing 410 is inserted into cage 160 and faceplate 460 is in the first position, pluggable transceiver 400 nominally resembles a conventional pluggable transceiver in that fiber optic connectors are easily and conveniently insertable into receptacles 412 through openings 462. However, when a user wishes to remove housing 410 from cage 460, the user is intuitively notified of the rotating characteristic of faceplate 460 by curved surface 465 and/or a suitable message such as "PULL" embossed on the front surface of faceplate 460, as shown in FIG. 4(A). Upon inserting a fingertip behind curved surface 465 and pulling forward, the user is able to rotate faceplate 460 into the second position shown in FIG. 4(B)). When rotated into the second position, faceplate 460 provides an easily graspable handle by which housing 410 is pulled from cage 160. Note again that in the second position (FIG. 4(B)), wall 464 prevents insertion of fiber optic connectors, thereby intuitively notifying the user that the transceiver is ready for removal from cage 160.

In accordance with a second aspect of the present invention, lever 470 is displaced (i.e., pivoted) relative to housing 410 when faceplate 460 is moved from the first position (FIG. 4(A)) into the second position (FIG. 4(B)) to facilitate the locking and unlocking of housing 410 relative to cage 160. In one embodiment, lever 470 is integrally connected to (i.e., formed in the same molding process as) housing 410 by torsion members 472, and has a first end 474 located adjacent to faceplate 460. Torsion members 472 bias lever 470 into a locked (unbiased or third) position (i.e., such that lever 470 is parallel to a plane defined by lower surface 414) when faceplate 460 is in the first position (FIG. 4(A)). As indicated in FIG. 4(B), faceplate 460 further includes a cam structure 480 that pushes or otherwise displaces first end 474 when faceplate 460 is rotated into the second position, thereby causing lever 470 to rotate around a second axis X2 defined by torsion members 472 into a locked (biased or fourth) position (i.e., such that lever 470 is inclined relative to the plane defined by lower surface 414). As described in the following specific examples, the displacement of first end 472 can either be upward, as shown in FIG. 4(B)), or downward. As also described in these examples, this displacement is utilized to engage and disengage a boss from the transceiver latch provided on conventional cage 160.

FIGS. 5(A) and 5(B) are alternative bottom perspective views showing lever 460(1) of a transceiver 400(1) according to a first specific embodiment of the present invention, and FIGS. 6(A) and 6(B) are simplified cross-sectional side views showing selected portions of transceiver 400(1) when faceplate 460(1) is in the first and second positions, respectively.

Referring to FIGS. 5(A) and 6(A), in the first disclosed embodiment, a boss 510 is integrally formed on a lower surface 411(1) of housing 410(1). In addition, lever 460(1) includes a front end portion 474(1) that is located adjacent to a cam structure 468(1) provided on faceplate 460(1), and members 522 and 524 that form a Y-shaped forked member 520 at a second end of lever 470(1). Note that torsion members 472(1) are positioned between first end portion 474(1) and forked member 520, and that members 522 and 524 are respectively positioned on opposite sides of boss 510, which is fixedly connected to lower wall 411(1). Note also, as shown in FIG. 6(A), that when faceplate 460(1) is in the first position, lever 470(1) remains substantially parallel to or coplanar with lower wall 411(1), which defines a plane P. In this locked position, resilient transceiver latch 170 is biased toward lower wall 411(1) of housing 410(1) (i.e., in the direction of arrow A). In the locked position, transceiver latch 170 is biased such that boss 510 is engaged in latch opening 175, thereby preventing removal of housing 410(1) from a host transceiver cage 160 (i.e., in the direction indicated by arrow D).

Referring to FIGS. 5(B) and 6(B), when faceplate 460(1) is subsequently rotated into the second position around the axis defined by pin 480, a contact surface of cam member 468(1) is moved upward to press against first end 474(1) of lever 470(1). The resulting upward movement of lever 470(1) causes lever 460(1) to pivot (rotate) around axis X2, which is defined by torsion members 472(1), and forces forked member 520 downward (in the direction of arrow B) to contact transceiver latch 170. As shown in FIG. 6(B), this movement causes lever 520 to become inclined relative to the plane P defined by lower wall 411(1). When faceplate 460(1) is rotated 90°, transceiver latch 170 is pressed downward far enough to disengage boss 510 from latch opening 175, thereby facilitating the removal of housing 410(1).

Figure 7A:
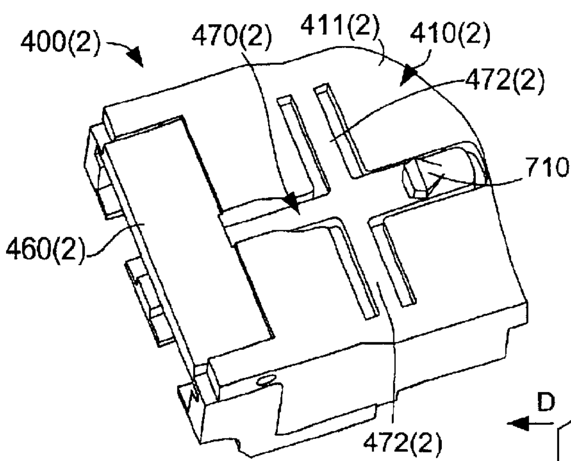
FIGS. 7(A) and 7(B) are alternative perspective views showing a lever of the release mechanism according to a second embodiment.
Figure 8A:
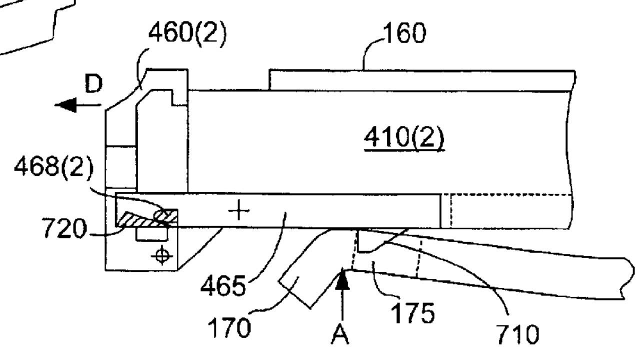
FIGS. 8(A) and 8(B) are simplified cross-sectional side views showing the lever of FIGS. 7(A) and 7(B) in a locked (first) position and an unlocked (second) position, respectively.
Figure 7B:
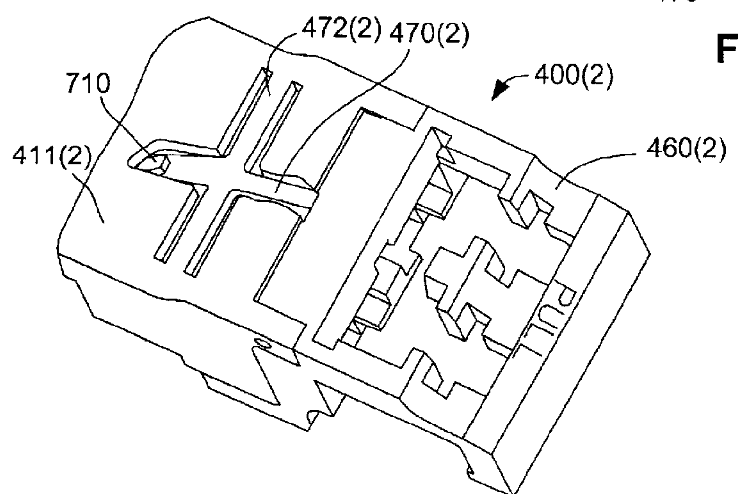
Figure 8B:
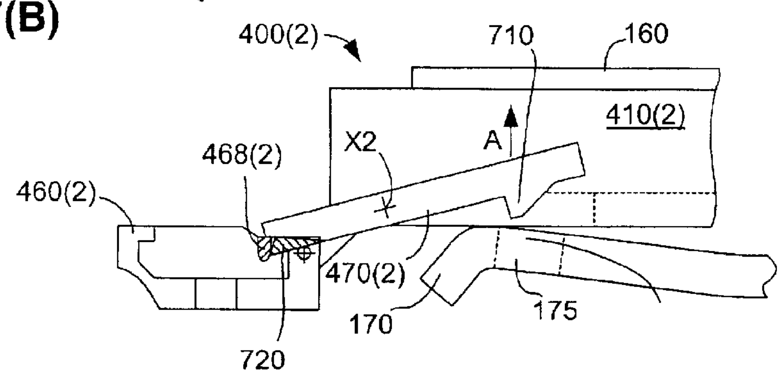

FIGS. 7(A) and 7(B) are alternative bottom perspective views showing lever 460(2) of a transceiver 400(2) according to a second specific embodiment of the present invention, and FIGS. 8(A) and 8(B) are simplified cross-sectional side views showing selected portions of transceiver 400(2) when faceplate 460(2) is in the first and second positions, respectively.

Referring to FIGS. 7(A) and 8(A), in the second disclosed embodiment, a boss 710 is integrally formed on a second end of lever 460(2) (i.e., as opposed to being formed on a lower wall 411(2) of housing 410(2)). In addition, lever 460(2) includes a front end portion 474(2) including a pawl 720 that is located adjacent to a cam structure 468(2) provided on faceplate 460(2). As shown in FIG. 8(A), when faceplate 460(2) is in the first position, lever 470(2) remains substantially parallel to or coplanar with lower wall 411(2), which defines a plane P. In this locked position, boss 710 extends below lower wall 411(2) and is engaged in latch opening 175, thereby preventing removal of housing 410(2) from a host transceiver cage 160 (i.e., in the direction indicated by arrow D).

Referring to FIGS. 7(B) and 8(B), when faceplate 460(2) is subsequently rotated into the second position around the axis defined by pin 480, a contact surface of cam member 468(2) is moved downward, and pulls against pawl 720, which causes pawl to slide along cam member 468(2) and to pull first end 474(2) of lever 470(2) downward. As indicated in FIG. 8(B), the resulting counter-clockwise rotation of lever 470(2) around axis X2 causes boss 710 to move upward (in the direction of arrow A). When faceplate 460(2) is rotated a fully 90°, boss 710 is fully retracted into housing 410(1), thereby disengaging boss 710 from latch opening 175 and facilitating the removal of housing 410(2) from cage 160.

Figure 9A:
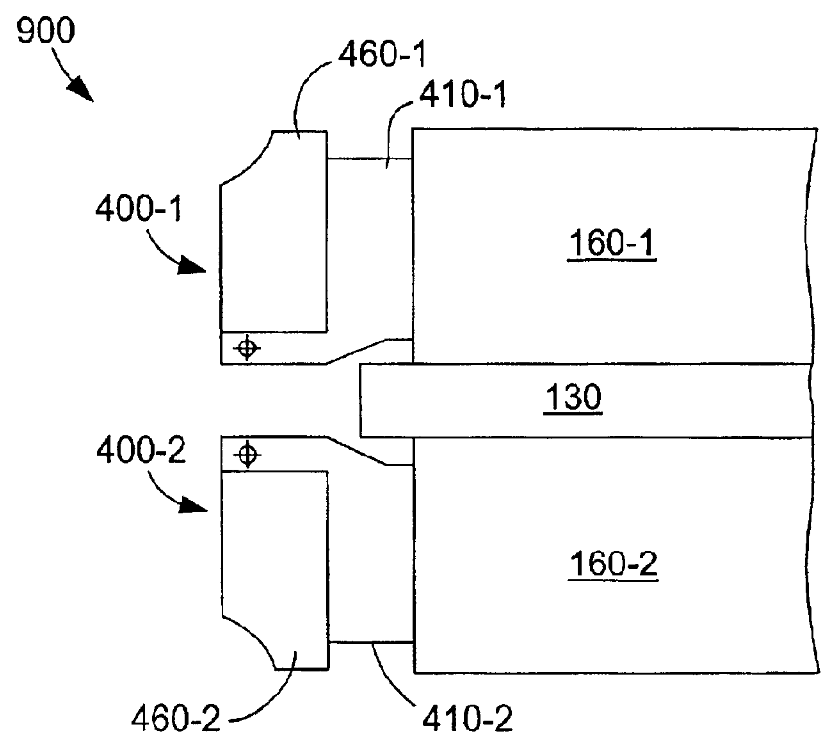
FIGS. 9(A) and 9(B) are simplified side views showing two transceivers including the release mechanisms of the present invention in a belly-to-belly arrangement.
Figure 9B:
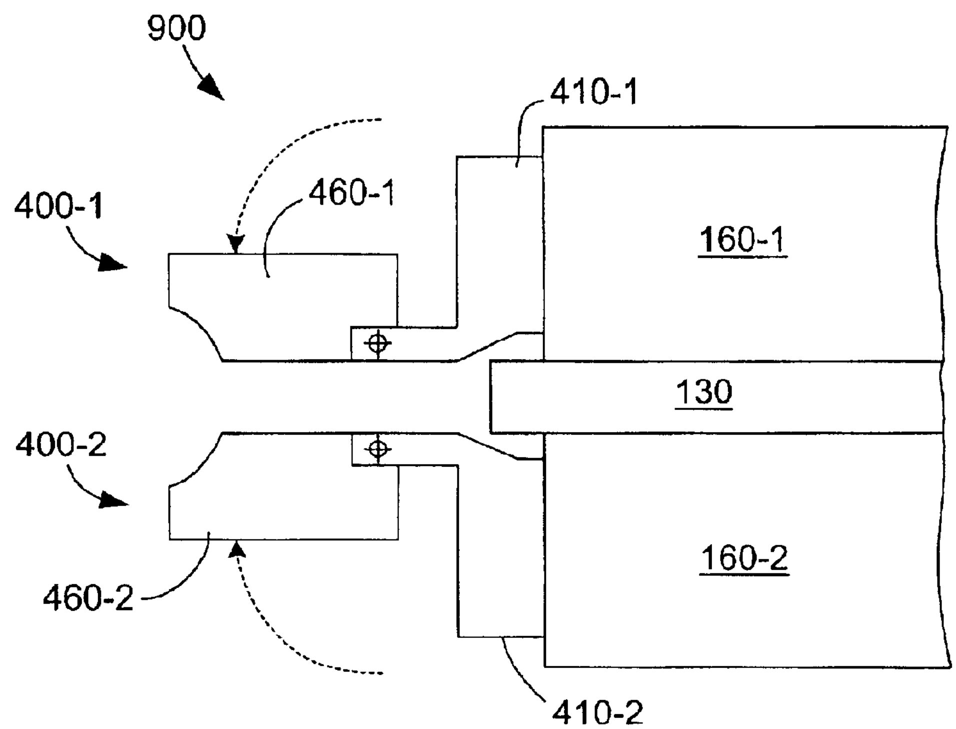

FIGS. 9(A) and 9(B) are simplified side views showing a "belly-to-belly" configuration 900 in which two transceivers 400-1 and 400-2 are mounted in associated cages 160-1 and 160-2 on opposite sides of host circuit board 130. Specifically, a first cage 160-1 is mounted on an upper side of host circuit board 130 into which a first transceiver 400-1 is inserted, and second cage 160-2 is mounted on a lower side of host circuit board 130 into which second transceiver 400-2 is inserted. Transceiver 400-1 and 400-2 include faceplates 460-1 and 460-2 connected to front surfaces of associated housings 410-1 and 410-2, respectively, and are rotated between locked positions (shown in FIG. 9(A)) and unlocked positions (shown in FIG. 9(B)). As indicated in FIG. 9(B), because faceplates 460-1 and 460-2 rotate in opposite directions (i.e., one upward and one downward), faceplate 460-1 does not interfere with the rotation of faceplate 460-2, and faceplate 460-2 does not interfere with the rotation of faceplate 460-1. Accordingly, the release mechanism of the present invention is particularly useful in highly populated transceiver assemblies, such as the belly-to-belly configuration 900 shown in FIGS. 9(A) and 9(B).

Although the present invention has been described with respect to certain specific embodiments, it will be clear to those skilled in the art that the inventive features of the present invention are applicable to other embodiments as well, all of which are intended to fall within the scope of the present invention. For example, a snap-coupling structure may be used in place of pin 480 (FIG. 4(A)) to rotatably secure the faceplate to the housing. Similarly, the integral torsion members may be replaced with separately formed pins. Moreover, the lever/boss arrangements described above are considered exemplary, and may be replaced by suitable arrangements that accomplish separation of the boss from the transceiver latch when the faceplate is in the second position (shown in FIG. 4(B)).

What is claimed is:

1. A pluggable transceiver comprising:

a housing having a front wall defining a receptacle for receiving a fiber optic connector;

a release mechanism including a faceplate pivotably connected to the housing such that the faceplate is rotatable from a first position in which the faceplate is positioned over the front surface of the housing to a second position in which the faceplate is pivoted away from the front surface of the housing; and a pin inserted into a first through hole formed adjacent to the front surface of the housing, and inserted into a second through hole defined in a flange of the faceplate.

2. A pluggable transceiver comprising:

a housing having a front wall defining a receptacle for receiving a fiber optic connector;

a release mechanism including a faceplate pivotably connected to the housing such that the faceplate is rotatable from a first position in which the faceplate is positioned over the front surface of the housing to a second position in which the faceplate is pivoted away from the front surface of the housing; and a lever connected to the housing by torsion members and having first end located adjacent to the faceplate, wherein the torsion members bias the lever into a locked position when the faceplate is in the first position, and wherein the faceplate includes a cam positioned to displace the first end of the lever when the faceplate is moved into the second position such that the lever is pivoted relative to the housing around an axis defined by the torsion members.

3. The pluggable transceiver according to claim 2, wherein the lever further comprises a second end located such that the torsion members are positioned between the first end and the second end, wherein the second end includes a forked member.

4. The pluggable transceiver according to claim 2, wherein the lever further comprises a second end located such that the torsion members are positioned between the first end and the second end, wherein the second end includes a boss.

5. A pluggable transceiver comprising:

a housing having a front wall defining a receptacle for receiving a fiber optic connector; and a release mechanism including:

a faceplate pivotably connected to the housing such that the faceplate is rotatable from a first position to a second position, wherein the faceplate includes a cam; and a lever movably mounted on the housing and having a first end located adjacent to the cam, wherein the cam is formed such that when the faceplate is rotated from the first position to the second position, the first end of the lever is displaced by the cam such that the lever moves from an unbiased position to a biased position.

6. The pluggable transceiver according to claim 5, wherein the faceplate defines a front opening that is aligned with the receptacle when the faceplate is in the first position.

7. The pluggable transceiver according to claim 5, wherein the faceplate further includes a top wall that is positioned to block insertion of the fiber optic connector into the receptacle when the faceplate is in the second position, and wherein the top wall includes a curved surface shaped to facilitate manual removal of the pluggable transceiver.

8. The pluggable transceiver according to claim 5, further comprising a pin inserted into a first through hole formed adjacent to the front surface of the housing, and inserted into a second through hole defined in a flange of the faceplate.

9. The pluggable transceiver according to claim 5, wherein the lever is connected to the housing by torsion members that bias the lever into a locked position when the faceplate is in the first position, wherein the lever includes a second end located such that the torsion members are positioned between the first end and the second end, and wherein the second end includes a forked member.

10. The pluggable transceiver according to claim 5, wherein the lever is connected to the housing by torsion members that bias the lever into a locked position when the faceplate is in the first position, wherein the lever includes a second end located such that the torsion members are positioned between the first end and the second end, and wherein the second end includes a boss.

11. A transceiver assembly comprising:

a cage defining a front opening and including a lower wall having a transceiver latch; and a pluggable transceiver removably insertable into the front opening of the cage and connected to the cage by a boss inserted into the transceiver latch, the pluggable transceiver including:

a housing having a front surface defining a receptacle for receiving a fiber optic connector; and a release mechanism including:

a faceplate pivotably connected to the housing such that the faceplate is rotatable from a first position position in which the faceplate is located adjacent to the front wall of the housing to a second position in which the faceplate is positioned away from the front surface of the housing, wherein the faceplate includes a cam; and a lever movably mounted on the housing and having a first end located adjacent to the cam, wherein the cam is formed such that when the faceplate is rotated from the first position to the second position, the first end of the lever is displaced by the cam such that the lever moves from an unbiased position in which the boss is engaged with the transceiver latch, to a biased position in which the boss is disengaged from the transceiver latch.

12. The transceiver assembly according to claim 11, wherein the faceplate defines a front opening that is aligned with the receptacle when the faceplate is in the first position.

13. The transceiver assembly according to claim 11, wherein the faceplate further includes a top wall that is positioned to block insertion of the fiber optic connector when the faceplate is in the second position, and wherein the top wall includes a curved surface shaped to facilitate manual removal of the pluggable transceiver.

14. The transceiver assembly according to claim 11, further comprising a pin inserted into a first through hole formed adjacent to the front surface of the housing, and inserted into a second through hole defined in a flange of the faceplate.

15. The transceiver assembly according to claim 11, wherein the boss is formed on a lower wall of the housing;

wherein the lever is connected to the housing by torsion members that bias the lever into a plane defined by the lower wall when the faceplate is in the first position, wherein the lever includes a forked member located such that the torsion members are positioned between the first end and the forked member, and wherein the forked member is positioned to push the transceiver latch away from the boss when the faceplate is rotated into the second position.

16. The transceiver assembly according to claim 11, wherein the lever is connected to the housing by torsion members that bias the lever into a plane defined by the lower wall when the faceplate is in the first position, wherein the boss is formed on a second end of the lever such that the torsion members are positioned between the first end and the boss, and wherein the cam pulls the first end of the lever when the faceplate is rotated into the second position such that the boss is disengaged from the transceiver latch.

17. A pluggable transceiver comprising:

a housing having a front wall defining a receptacle for receiving a fiber optic connector; and a release mechanism including:

a first lever pivotably connected to the housing such that the first lever is rotatable from a first position to a second position, wherein the first lever includes a cam; and a second lever movably mounted on the housing and having a first end located adjacent to the cam, wherein the cam is formed such that when the first lever is rotated from the first position to the second position, the first end of the second lever is displaced by the cam such that the second lever moves from an unbiased position to a biased position.

18. The pluggable transceiver according to claim 17, wherein the first lever defines a front opening that is aligned with the receptacle when the first lever is in the first position.

19. The pluggable transceiver according to claim 17, wherein the first lever further includes a top member that is positioned to block insertion of the fiber optic connector into the receptacle when the first lever is in the second position, and wherein the top member is shaped to facilitate manual removal of the pluggable transceiver.

20. The pluggable transceiver according to claim 17, further comprising a pin inserted into a first through hole formed adjacent to the front surface of the housing, and inserted into a second through hole defined in a flange of the first lever.

21. The pluggable transceiver according to claim 17, further comprising a torsion member disposed to bias the second lever into a locked position when the first lever is in the first position.

22. A transceiver assembly comprising:

a cage defining a front opening and including a lower wall defining an opening; and a pluggable transceiver removably insertable into the front opening of the cage and connected to the cage by a boss inserted into the opening, the pluggable transceiver including:

a housing having a front surface defining a receptacle for receiving a fiber optic connector; and a release mechanism including:

a first lever pivotably connected to the housing such that the first lever is rotatable from a first position position in which the first lever is located adjacent to the front wall of the housing to a second position in which the first lever is positioned away from the front surface of the housing, wherein the first lever includes a cam; and a second lever movably mounted on the housing and having a first end located adjacent to the cam, wherein the cam is formed such that when the first lever is rotated from the first position to the second position, the first end of the second lever is displaced by the cam such that the second lever moves from an unbiased position in which the boss is engaged with the opening, to a biased position in which the boss is disengaged from the opening.

23. The transceiver assembly according to claim 22, wherein the first lever defines a front opening that is aligned with the receptacle when the first lever is in the first position.

24. The transceiver assembly according to claim 22, wherein the first lever further includes a top member that is positioned to block insertion of the fiber optic connector when the first lever is in the second position, and wherein the top member is shaped to facilitate manual removal of the pluggable transceiver.

25. The transceiver assembly according to claim 22, further comprising a pin inserted into a first through hole formed adjacent to the front surface of the housing, and inserted into a second through hole defined in a flange of the first lever.

26. The transceiver assembly according to claim 22, further comprising a torsion member disposed to bias the second lever into a plane defined by the lower wall when the first lever is in the first position, wherein the boss is formed on a second end of the second lever, and wherein the cam pulls the first end of the second lever when the first lever is rotated into the second position such that the boss is disengaged from the opening.

* * * * *

UNITED STATES PATENT AND TRADEMARK OFFICE

CERTIFICATE OF CORRECTION

PATENT NO. : 6,789,958 B2
DATED : September 14, 2004
INVENTOR(S) : Michael E. Ahrens et al.

It is certified that error appears in the above-identified patent and that said Letters Patent is hereby corrected as shown below:

Title page,
Item [74], *Attorney, Agent, or Firm*, replace "Earms" with -- Harms --.

Column 9,
Line 20, delete "position" (second occurrence).

Column 10,
Line 51, delete "position".

Signed and Sealed this

Eighteenth Day of October, 2005

JON W. DUDAS
*Director of the United States Patent and Trademark Office*